Patented Oct. 2, 1928.                                                  1,686,330

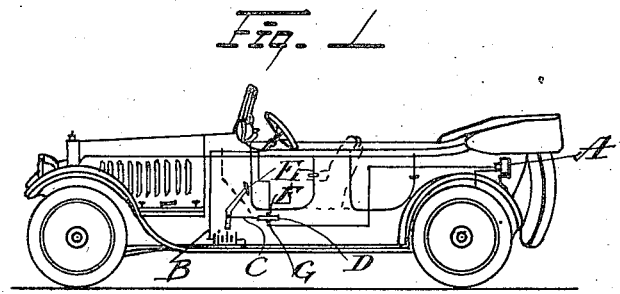
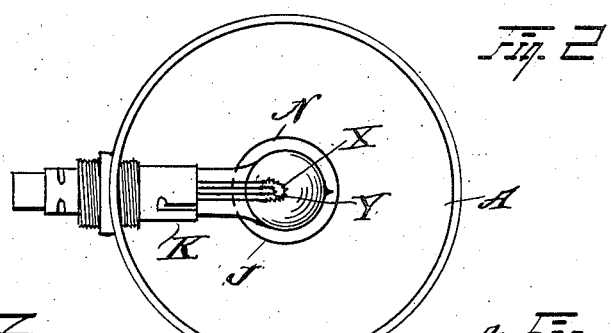
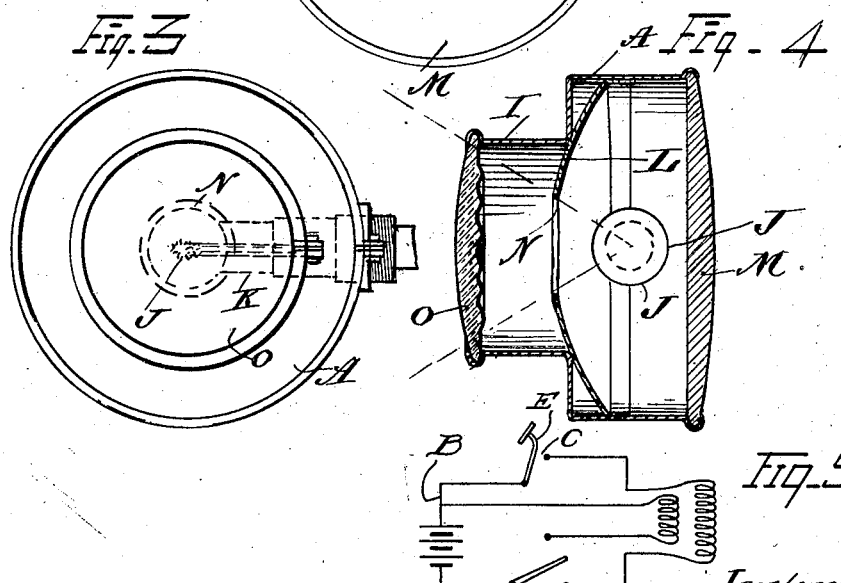

UNITED STATES PATENT OFFICE.

STANLEY R. LEESON, OF LAKEWOOD, OHIO.

COMBINED SIGNAL AND PARKING LIGHT FOR MOTOR CARS.

Application filed September 15, 1921. Serial No. 500,823.

The objects of the invention are to provide:

First, a means for showing a signal light towards the front of a motor car and towards the rear, when the car is standing in a parked position, thus providing for the required amount of safety to passing vehicles and conserving the electrical energy and expense, since one source of light is employed which is visible from the roadway in both directions.

Second, to provide means for controlling the amount of light produced, to adapt the lamp to different and distinct uses, in which a greater or less amount of illumination is required, as, for instance, when the car is parked a light of from two to six candle power will be sufficient to be visible at a distance, and when functioning as a signalling device, to indicate a slowing down, or a stop or change of direction, a much higher amount of illumination is required, such as that of a lamp of twenty-one to fifty candle power.

Third, to provide a signalling light and an electric circuit therefor, and a switch in said circuit which is actuated by the operation of one of the controlling devices of the car, such as the brake or clutch lever, or rod.

Fourth, to provide in connection with a rear danger signal, a forwardly projected light, which serves as a parking light, and is employed as a precaution to inform an approaching vehicle of the position of the car.

Fifth, to provide a means for indicating by the glowing of a red light visible from the rear to the man or car approaching from the rear, that a full stop or slowing down of speed, or a change of direction of the car in front, is about to be made.

The invention comprises, a shell or casing, into which a reflector is fitted. This casing is positioned at the left side of the car, and a lamp therein is designed to project its rays both towards the front and rear of the car.

The reflector is illuminated by means of an electric light at or adjacent to the focal point of the reflector, which in turn casts its rays through a red or danger signal lens at the rear. The reflector is also provided with a central opening in its wall, the purpose of which is to enable the rays of light, emanating from the electric light in front of the reflector, to be projected towards the front, and to illuminate a lens, preferably formed of opalescent or green glass, according to the regulations of individual States, and which lens is secured in the front wall of the outer shell or casing.

The shell is so constructed as to form chambers of different sizes, which are separated by the transverse reflector in the manner of a partition.

In this manner, the light projected from one lens is prevented from being confused with, or diffused into, the light projected from the other lens, thus providing a separate parking light and a separate tail light, and when functioning as a danger signal, the reflector distinctly reflects the greater portion of the rays from the lamp to the danger signal and at the same time the front lens is illumined by the rays which pass through the central opening in the partition.

The invention also includes the utilization of a standard two-filament bulb, constructed and arranged to produce a variable amount of light, to adapt the lamp to the aforesaid purposes, that is, for a danger signal, and for combined parking and tail light purposes, the first requiring the higher candle power and the second the lower candle power.

This is accomplished by means of a bulb, containing two filaments, of different candle power, and a two-way switch constructed and arranged to break the circuit leading to one filament simultaneously with closing the circuit to the other filament.

The invention further comprises the combination and arrangement of parts, and construction of the various details, hereinafter described, shown in the accompanying drawings, and specifically pointed out in the claim.

In the accompanying drawings, Fig. 1 is a side elevation of a car, showing the mode of operation of the device; Fig. 2 is a front elevation of the lamp; Fig. 3 is a rear elevation thereof; Fig. 4 is a longitudinal section thereof; Fig. 5 is a diagram of the lamp circuits.

The lamp comprises, a casing, A, having a reduced front portion, I, and an electric lamp, J, is secured to the casing by means of a transversely placed socket, K, so that its rays can be projected towards the front and rear without interference from the socket.

A reflector, L, is also placed in the manner of a partition between the front and rear portions of the casing, and separates it into two chambers.

The lamp is placed at the focal point of the reflector, and its rays are projected rearwardly through a red or otherwise colored transparency or glass wall, M, detachably secured in the casing.

The work Stop, or Slow, or any desired danger sign, may be pressed in the glass, to arrest the attention of a following driver, although the red light projected therefrom is a sufficient signal to notify the driver of the following car that the car with the light is about to stop, slow down, or change direction.

The rays of the lamp are also projected forwardly through a central opening in the wall of the reflector, and pass through an opalescent or translucent glass lens, O, at the front of the smaller chamber.

This light is softened and diffused by the opalescent nature of the lens, O, and is so directed as to appear at the side of the car, so that the driver of a passing car can see it clearly after he has passed by the blinding headlights.

This is all the more necessary, since car drivers do not always remember to dim the headlights, to accommodate them to the eyesight of the driver of an approaching car.

The distance of the opalescent lens from the source of light and central opening in the reflector should be such that the rays projected from the opening should include the entire surface of the lens, as shown in Fig. 4, or a black spot in the projection may be the result.

That is, the lens, O, should focus on the lamp through the opening, and the opening should allow those rays which fall upon that portion of the mirror to pass through, without being made so large as to destroy the efficiency of the reflector for projecting the rays to the rear through the danger lens, M.

The lamp should preferably be provided with two filaments, X and Y, one being of less candle power than the other, to permit the strength of the illumination to be reduced when the machine is parked, thus saving electrical energy by the use of one lamp only, of a smaller candle power.

In this manner the light from the lamp will mark the position of the car by a spot of light to a driver approaching from either front or rear.

Having described the invention, what I claim as new, and desire to secure by Letters Patent, is:

In a combined parking and signalling lamp, a front and a rear lens, an incandescent lamp between the two lenses to project light through each lens having a single bulb with a pair of filaments of different light emitting intensity therein, and means for selectively effecting flow of current through either filament to the exclusion of the other, whereby the filament of lesser intensity serves for parking use and the other filament serves for combined parking and stop signal use.

In testimony whereof, I hereunto set my hand this 13th day of September 1921.

STANLEY R. LEESON.